United States Patent
Akiyama

[11] Patent Number: 5,103,398
[45] Date of Patent: Apr. 7, 1992

[54] SHIFT CONTROL FOR SLIP CONTROL
[75] Inventor: Takeo Akiyama, Tokyo, Japan
[73] Assignee: Nissan Motor Co., Ltd., Yokohama, Japan
[21] Appl. No.: 394,335
[22] Filed: Aug. 16, 1989
[30] Foreign Application Priority Data
Aug. 20, 1988 [JP] Japan .................. 63-207126
[51] Int. Cl.⁵ .................. B60K 41/04; B60K 41/18
[52] U.S. Cl. .................. 364/424.1; 364/426.03; 180/197; 74/866
[58] Field of Search ............ 364/426.03, 426.02, 364/424.1; 180/197, 249; 74/866

[56] References Cited
U.S. PATENT DOCUMENTS

| | | | |
|---|---|---|---|
| 3,741,043 | 6/1973 | Oya et al. | 180/197 |
| 4,680,992 | 7/1987 | Hayasaki et al. | 74/869 |
| 4,699,236 | 10/1987 | Morisawa et al. | 364/424.1 |
| 4,779,696 | 10/1988 | Harada et al. | 364/426.01 |
| 4,838,125 | 6/1989 | Hamano et al. | 364/424.1 |
| 4,866,625 | 9/1989 | Kawamoto et al. | 180/249 |

FOREIGN PATENT DOCUMENTS
62-45944 2/1987 Japan.

OTHER PUBLICATIONS
"Nissan Full-Range Automatic Transmission RE4R-01A Type, Service Manual, (A261C07)", Mar., 1987.

Primary Examiner—Parshotam S. Lall
Assistant Examiner—Gary D. Yacura
Attorney, Agent, or Firm—Foley & Lardner

[57] ABSTRACT

In an automotive vehicle, a shift in speed position is suppressed by increasing a hysteresis amount in vehicle speed between an shift-up vehicle speed and a shift-down vehicle speed when a periodic variation in engine output is effected under the control of a slip control unit, or by inhibiting a downshift for a predetermined length of time during the periodic variation in engine output effected under the control of the slip control unit.

5 Claims, 7 Drawing Sheets

SHIFT CONTROL FOR SLIP CONTROL

BACKGROUND OF THE INVENTION

The present invention generally relates to an automotive vehicle including a slip control for effecting periodic variation in engine output in order to suppress slip which driving wheels undergo, and more particularly to a shift control for an automatic transmission of such automotive vehicle.

It is known from Japanese Patent Application Kokai (JP-A) 62-45944 to effect periodic variation in engine output by controlling second throttle valve disposed in series in an intake passage with a first throttle valve operatively connected with an accelerator pedal in order to suppress slip which driving wheels undergo.

A shift control for an automatic transmission is known where a throttle opening degree of the throttle valve which is operatively connected with an accelerator pedal is measured and a revolution speed of the transmission output shaft is measured, and they are used to determined an appropriate speed or gear position. If this shift control is used in conjunction with the above-mentioned slip control, there occurs a problem that undesired periodic shift in speed position might take place during the slip control, since during the slip control the revolution speed of the transmission output shaft deviates greatly from the actual vehicle speed when the driving wheels undergo slip.

An object of the present invention is to improve the shift control to adapt well to the slip control without any change in sensors which the shift control relies on.

SUMMARY OF THE INVENTION

According to the present invention, there is provided a system for controlling a shift in speed position in an automatic transmission drivingly connected to an engine of an automotive vehicle with an accelerator pedal and driving wheels, the engine including a throttle valve which opens in degrees in response to the accelerator pedal, the automatic transmission including an output shaft drivingly connected to the driving wheels, the automotive vehicle including slip control means for controlling the engine output in order to suppress slip which the driving wheels undergo, throttle opening degree sensor means for measuring a throttle opening degree of the throttle valve and generating a throttle opening degree indicative signal, and vehicle speed sensor means for measuring a revolution speed of the transmission output shaft and generating a vehicle speed indicative signal indicative of the revolution speed of the transmission output shaft measured, the system comprising; means responsive to the throttle opening degree indicative signal and the vehicle speed indicative signal for determining a speed position in accordance with a predetermined shift schedule, with which a new speed position that has been changed by an upshift from an old gear position when the vehicle speed indicative signal exceeds a predetermined shift-up vehicle speed with the throttle indicative signal being at a predetermined value fails to return to said old speed position until the vehicle speed indicative signal drops down to a predetermined shift-down vehicle speed with the throttle indicative signal being at the same predetermined value, the predetermined shift-down vehicle speed being lower than the shift-up vehicle speed by a hysteresis amount, and means for modulating the speed position determining means such as to suppress a shift in speed position when the slip control means controls the engine output of the engine.

DETAILED DESCRIPTION OF THE INVENTION

Figure 1:
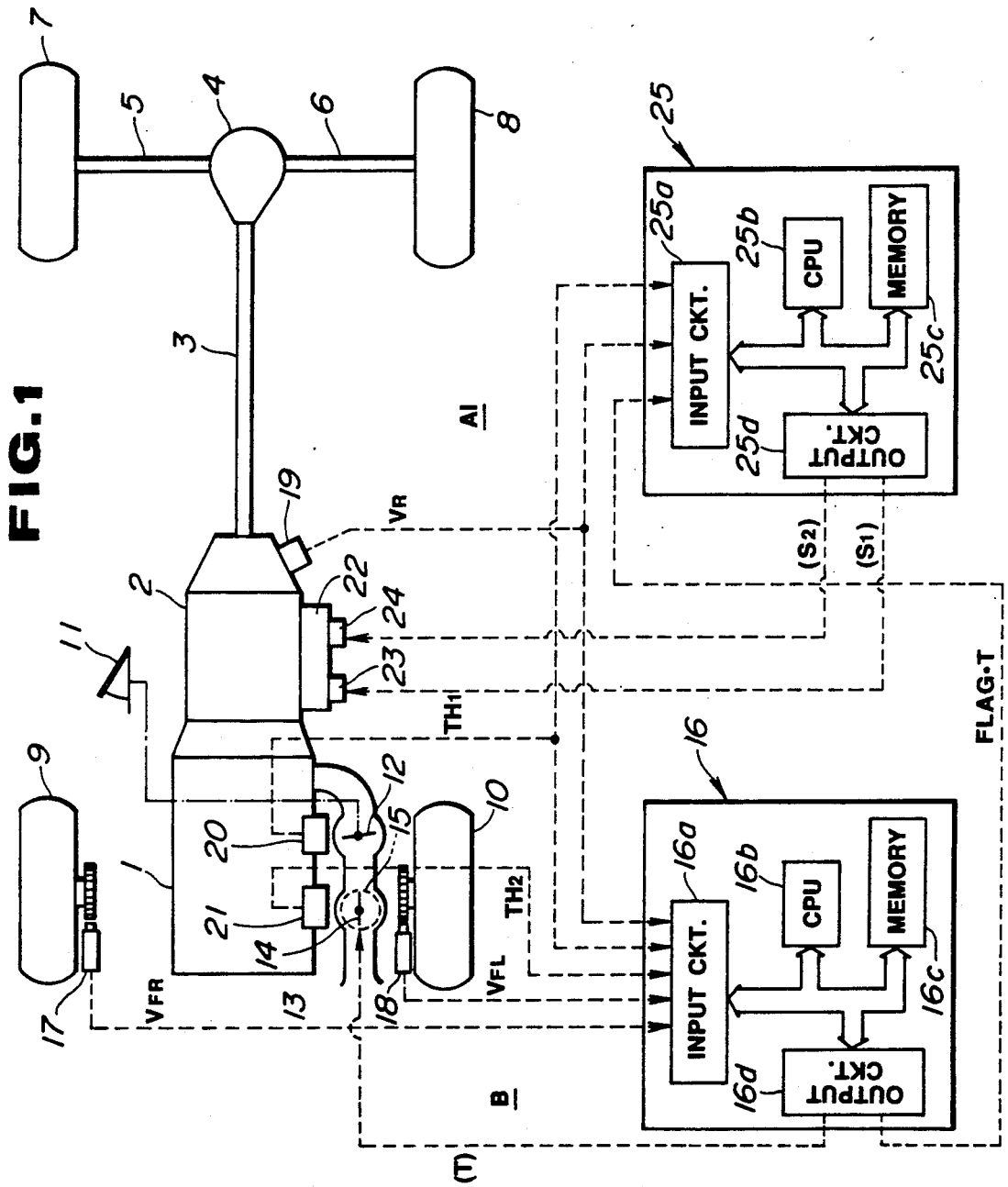
FIG. 1 is a block diagram of an automotive vehicle where the present invention is embodied.

Referring to FIG. 1, there is shown a diagram of an automotive vehicle including an internal combustion engine 1, an automatic transmission 2, a propeller shaft 3, a differential 4, rear drive shafts 5, 6, rear wheels 7, 8, and front wheels 9, 10. The engine 1 is provided with an engine output control device generally denoted by the reference character B.

The automatic transmission 2 is of the RE4R01A type described in "NISSAN FULL-RANGE AUTOMATIC TRANSMISSION RE4R01A TYPE, SERVICE MANUAL, (A261C07)" issued on March, 1987 by NISSAN MOTOR COMPANY LIMITED. The automatic transmission of the this type is also disclosed in U.S. Pat. No. 4,680,992 (Hayasaki et al.) which is hereby incorporated in its entirety by reference.

The engine output control device B includes a second throttle valve 14 disposed in an intake passage 13 in series with a first throttle valve 12 also disposed therein and coacting with an accelerator pedal 11. It also includes a throttle motor 15, namely, a throttle actuator, for opening the second throttle valve 14, and a slip control or engine output control unit 16 designed to generate a command signal (T) which the throttle motor 15 operates on to adjust the opening degree of the second throttle valve 14. The function performed by this control unit 16 is to adjust the opening degree of the second throttle valve 14 to control the engine output in such a manner as to suppress slip which the driving wheels 7 and 8 undergo.

The control unit 16 comprises an input circuit 16a, a central processing unit (CPU) 16b, a memory 16c including a RAM and a ROM, and an output circuit 16d.

Output signals of sensors are supplied to the input circuit 16a. The sensors include a first wheel speed sensor 17 provided to measure a wheel speed $V_{FR}$ of the front right wheel 9, a second wheel speed sensor 18 provided to measure a wheel speed $V_{FL}$ of the front left wheel 10, a vehicle speed $V_{FL}$ sensor 19 provided to measure a revolution speed of the transmission output shaft $V_R$, a first throttle opening degree sensor 20 provided to measure an opening degree $TH_1$ of the first throttle valve 12, and a second throttle opening degree sensor 21 provided to measure an opening degree $TH_2$ of the second throttle valve 14. The revolution speed measured by the vehicle speed sensor 19 is indicative of the wheel speed of the driving wheels 7 and 8 and thus indicative of the vehicle speed. However, $V_R$ fails to indicate the vehicle speed under conditions where the driving wheels 7 and 8 are slipping with respect to the road surface.

Output signal of the output circuit 16d include the command signal (T) supplied to the throttle motor 15 for the second throttle valve 14, and an indicator signal FLAG.T supplied to a shift point control unit 25. The indicator signal FLAG.T is set to 1 when the engine output is controlled by the slip control unit 16, but reset to 0 when the engine output is not controlled by the slip control unit 16.

Generally denoted by the reference character Al is a shift actuator. The shift actuator Al comprises a first shift solenoid 23 and a second shift solenoid 24 of a control valve assembly 22 of the automatic transmission 2. It also includes the above-mentioned shift control unit 25 which generates shift command signals ($S_1$) and ($S_2$) supplied to the shift solenoids 23 and 24, respectively. The shift control unit 25 contains a shift scheduling map 26 (see FIG. 2) and another shift scheduling map 27 (see FIG. 3) and retrieving these maps 26 and 27 using $V_R$ and $TH_1$ to determine an appropriate gear position.

The shift control unit 25 comprises an input circuit 25a, a CPU 25b, a memory 25c including a RAM and a ROM, and an output circuit 25d.

Supplied to the input circuit 25a are $V_R$ from the vehicle speed sensor 19, $TH_1$ from the first throttle opening degree sensor 20, and FLAG.T from the slip control unit 16.

Figure 2:
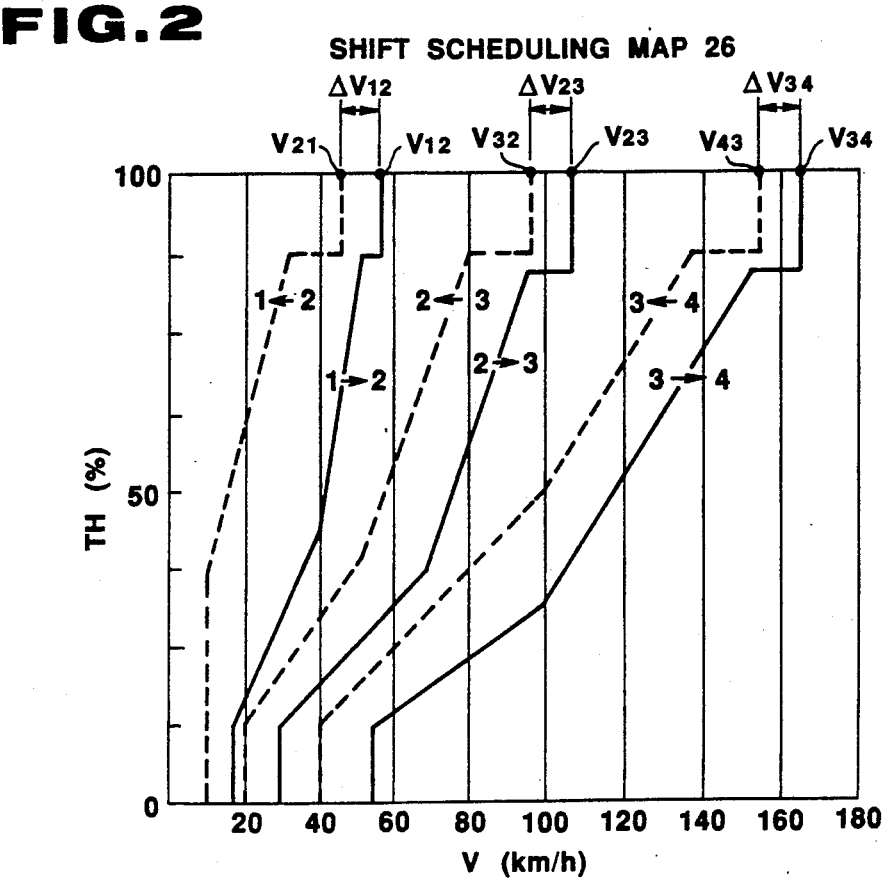
FIGS. 2 and 3 are shift scheduling maps.
Figure 3:
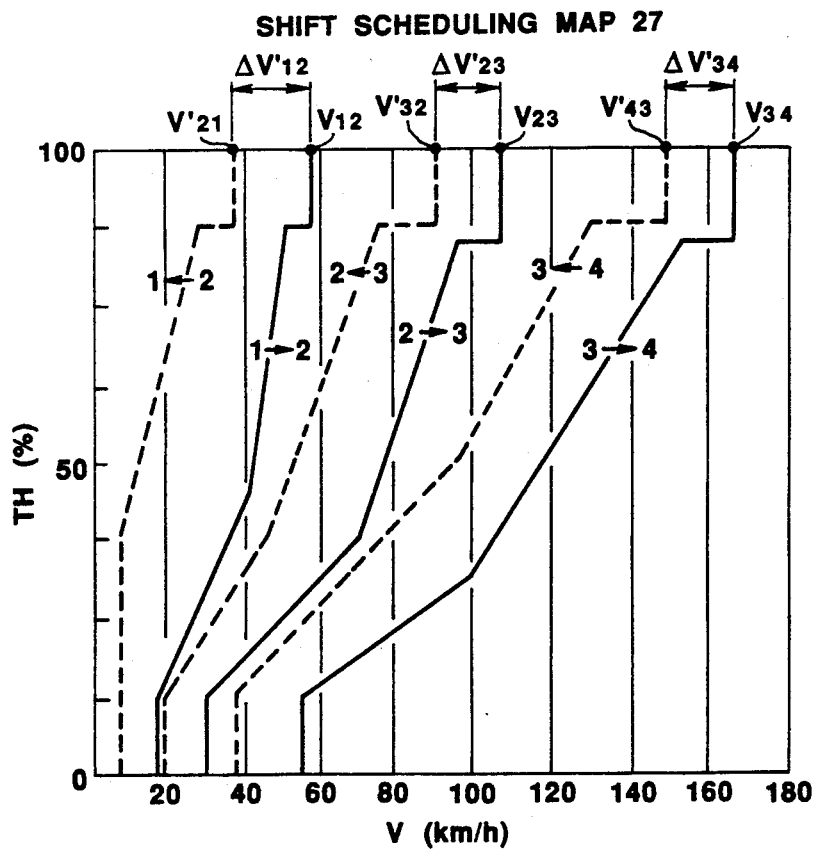

The before-mentioned shift scheduling maps 26 and 27 shown in FIGS. 2 and 3 are stored in the ROM of the memory 25c. The shift scheduling map 26 is used to determine a gear position when the engine output control is not carried out, while the other shift scheduling map 27 is used when the engine output torque control is carried out. In each of the maps 26 and 27, a first shift-up vehicle speed $V_{12}$ which a 1-2 upshift is to be effected at, a second shift-up vehicle speed $V_{23}$ which a 2-3 upshift is to be effected at, and a third shift-up vehicle speed $V_{34}$ which a 3-4 upshift is to be effected at are set for each of different throttle opening degrees ranging from 0% to 100%. The various values of the shift-up vehicle speed for each of the upshifts are plotted as illustrated by one of a set of fully drawn upshift lines. As will be readily seen, the same set of upshift lines are used in each of the maps 26 and 27. However, different downshift lines as illustrated by broken lines are set for the same downshift in the maps 26 and 27, respectively. In the map 26, a first shift-down vehicle speed $V_{21}$, a second shift-down vehicle speed $V_{32}$, and a third shift-down vehicle speed $V_{43}$ for the corresponding downshifts are plotted for each of different throttle opening degrees as illustrated by the downshift lines, respectively. In the map 27, three shift-down vehicle speeds $V'_{21}$, $V'_{32}$, and $V'_{43}$ 43 which corresponds to the first, second, and third vehicle speeds $V_{21}$, $V_{32}$, and $V_{43}$ are set. As shown in FIG. 2, the 2-1 downshift line deviates from the 1-2 upshift line toward low vehicle speed side with a hysteresis amount $\Delta V_{12}$ (delta $V_{12}$), the 3-2 downshift line from the 2-3 upshift line with a hysteresis amount $\Delta V_{23}$ (delta $V_{23}$), and the 4-3 downshift line from the 3-4 upshift line with a hysteresis amount $\Delta V_{34}$ (delta $V_{34}$). Similarly, as shown in FIG. 3, the 2-1 downshift line deviates from the 1-2 upshift line toward low vehicle speed side with a hysteresis amount $\Delta V'_{12}$ (delta $V'_{12}$), the 3-2 downshift line from the 2-3 upshift line with a hysteresis amount $\Delta V'_{23}$ (delta $V'_{23}$), and the 4-3 downshift line from the 3-4 upshift line with a hysteresis amount $\Delta V'_{34}$ (delta $V'_{34}$). The hysteresis amounts $\Delta V'_{12}$, $\Delta V'_{23}$, and $\Delta V'_{34}$ in the map 27 are greater than the corresponding hysteresis amounts and $\Delta V_{12}$, $\Delta V_{23}$, and $\Delta V_{34}$ in the map 26.

The operation is described.

Figure 4:
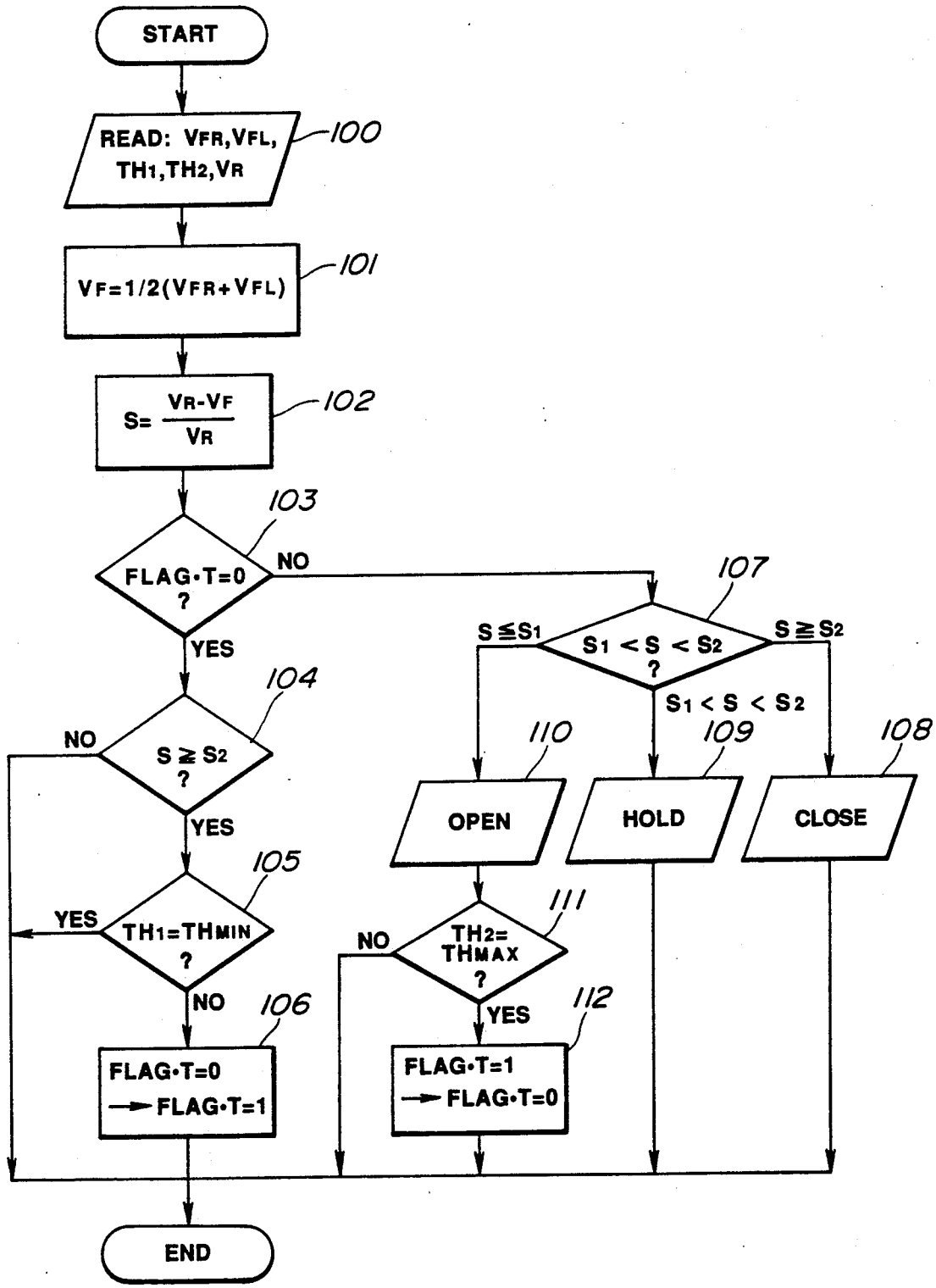
FIGS. 4 and 5 are flowcharts used in the first embodiment according to the present invention.

First of all, the function performed by the slip control unit 16 is explained along with the flowchart shown in FIG. 4.

In FIG. 4, at a step 100, a reading operation of the wheel speed $V_{FR}$ for the front right wheel 9, wheel speed $V_{FL}$ for the front left wheel 10, the throttle opening degree $TH_1$ of the first throttle valve 12, and the throttle opening degree $TH_2$ of the second throttle valve 14 is performed.

Then, the program proceeds to a step 101 where a front wheel speed $V_F$ is derived by calculating the average between $V_{FR}$ and $V_{FL}$, viz., $V_F = (V_{FR} + V_{FL})/2$.

At the next step 102, a slip ratio S is derived by calculating an equation $S = (V_R - V_F)V_R$.

At a judgement step 103, the status of the signal FLAG T is judged to determine whether the engine output control is not carried out (FLAG.T=0) or the engine output control is carried out (FLAG.T=1).

If FLAG T=0 as a result of the judgement at the step 103, the program proceeds to a step 104 and then to a step 105 to check whether conditions to initiate the engine output control are met or not. That is, the engine output control is to be carried out when the slip ratio is greater than or equal to a predetermined value $S_2$ (step 104) and when the first throttle opening degree $TH_1$ is not at the fully closed position $TH_{MIN}$ (step 105), and if these two conditions are met, the program proceeds to a step 106 where FLAG T is set to 1.

After FLAG T has been set to 1 at the step 106, the program proceeds, in the subsequent run, from the step 103 to a step 107 and the subsequent step or steps where the engine output control by periodic opening or closing of the second throttle valve 14 is carried out until FLAG T is reset to 0 at a step 112.

At the step 107, the slip ratio S is compared with two predetermined values $S_1$ and $S_{22}$.

If, at the step 107, $S \geq S_2$, the program proceeds to a step 108 where an instruction to close the valve 14 is generated and supplied to the throttle motor 15. The throttle motor 15 thus activates the second throttle valve 14 in the closing direction.

If, at the step 107, $S_1 < S < S_2$, the program proceeds to a step 109 where an instruction to maintain the current position of the valve 14 is generated and supplied to the throttle motor 15. Thus, the second throttle valve 14 maintains its current position.

If, at the step 107, $S \leq S_1$, the program proceeds to a step 110 where an instruction to open the valve 14 is generated and supplied to the throttle motor 15. Then, the throttle motor 15 activates the second throttle valve 14 in the opening direction.

When the second throttle valve opening degree $TH_2$ becomes equal to a predetermined value $TH_{MAX}$, namely, when the second throttle valve 14 is fully opened, owing to the fact that the driving wheel slip is suppressed, the program proceeds to the step 112 from a step 111, since a condition to terminate the engine output control checked at the step 111 is met. At the step 112, FLAG.T is reset to 0.

Figure 5:
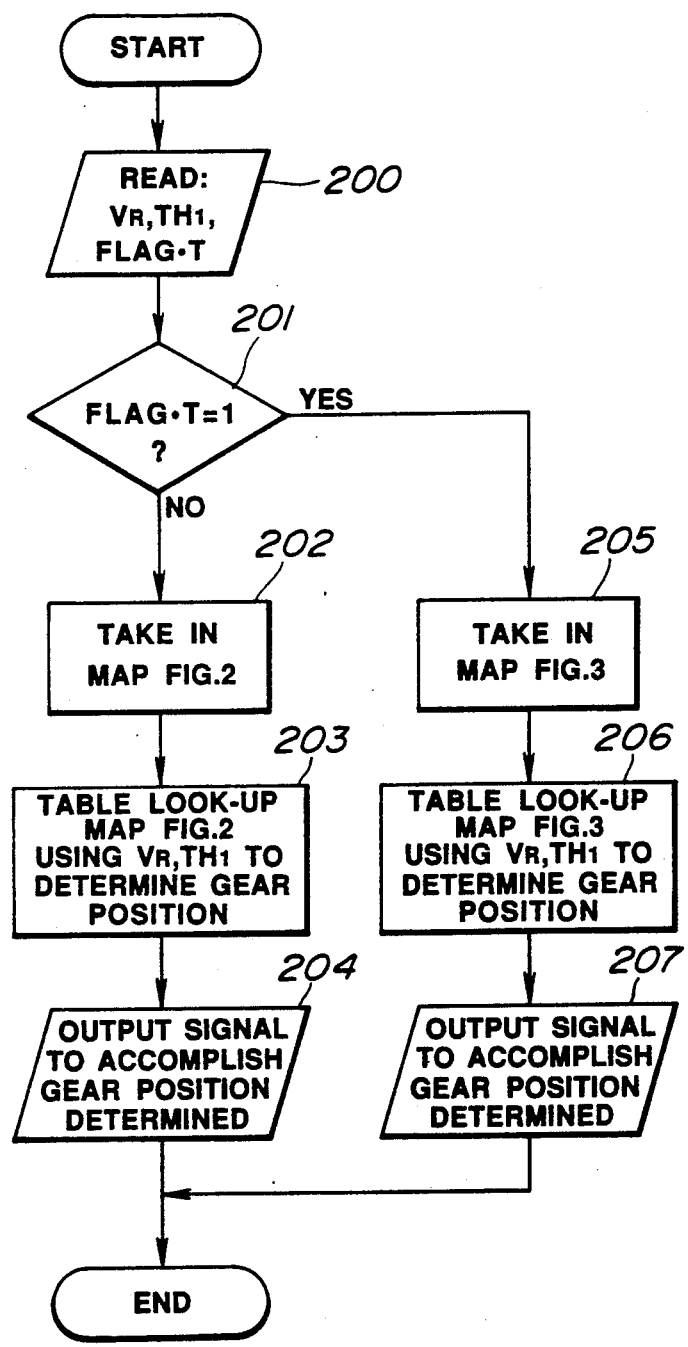

Referring to the flowchart shown in FIG. 5, the function performed by the shift control unit 25 is explained.

In FIG. 5, at a step 200, a reading operation of $V_R$, $TH_1$, and FLAG T is performed.

At the subsequent step 201, a determination is made whether FLAG.T=1 or not to check whether or not the engine output control is carried out.

At the step 201, a determination is made whether or not the status FLAG.T=1 is established in order to check whether the engine output control is carried out or not.

If, at the step 201, FLAG.T=0, the program proceeds to a step 202 where the shift scheduling map 26 shown in FIG. 2 is taken in or set, and then at a step 203, a table look-up operation of the map 26 is performed using $V_R$ and $TH_1$ to determine a gear position. Then, the program proceeds to a step 204 where shift command signals are supplied to the shift solenoids 23 and 24 to render them to assume appropriate statuses to accomplish the gear position determined.

On the other hand, if, at the step 201, FLAG.T=1, the program proceeds to a step 205 where the shift scheduling map 27 shown in FIG. 3 is taken in, and at a step 206, a table look-up operation of the map 27 shown in FIG. 3 is performed using $V_R$ and $TH_1$ to determine a gear position. Then the program proceeds to a step 207 where shift command signals are supplied to the shift solenoids 23 and 24 to render them to assume appropriate statuses to accomplish the gear position just determined.

Figure 6:
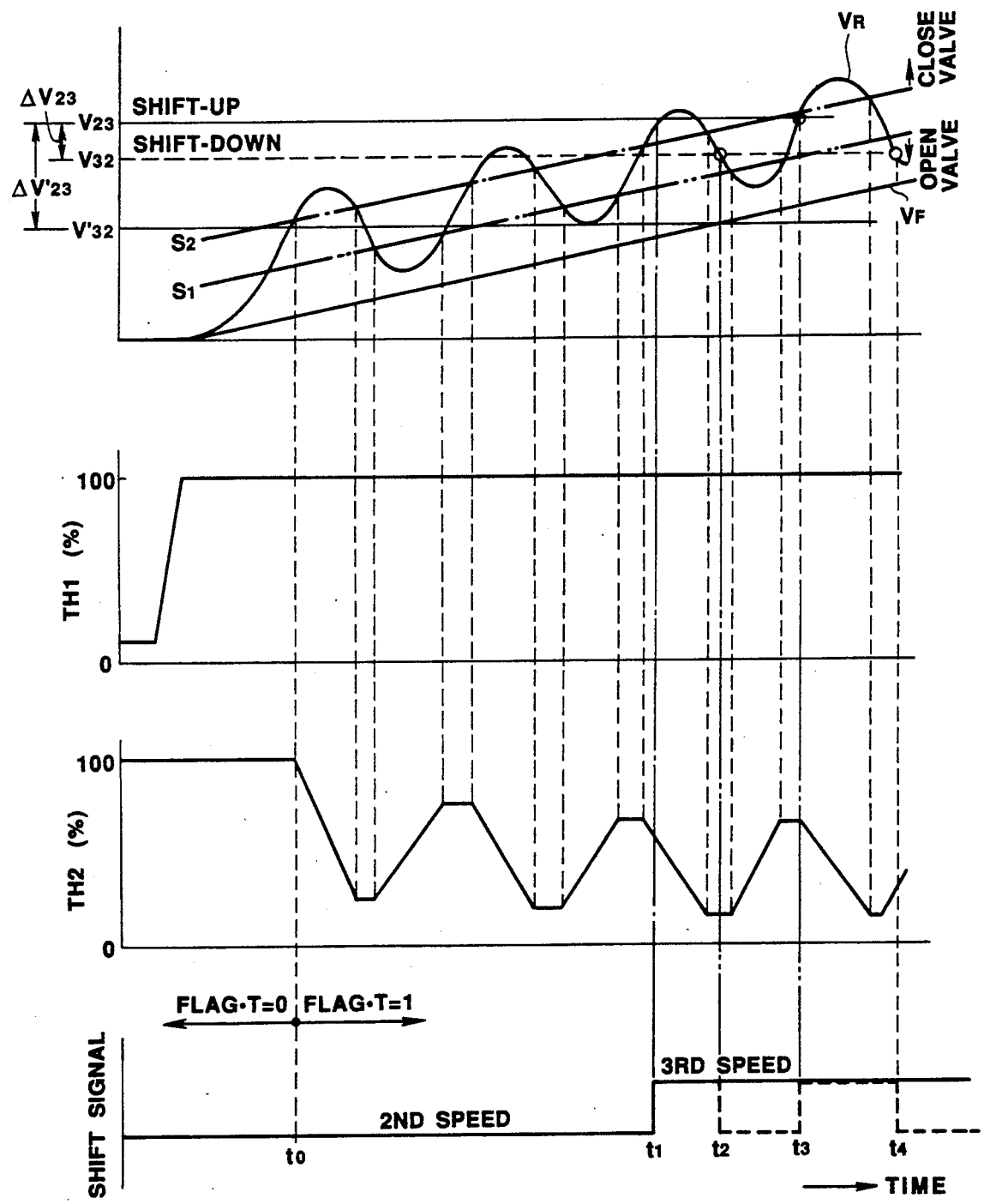
FIG. 6 is a time chart illustrating the feature of the first embodiment.

Referring to FIG. 6, the manner how the engine output control and shift point control progress is explained when the vehicle is running with the second speed immediately after it has been started from a standstill with the second throttle valve 14 fully opened. The driving wheel slip is apt to be induced under this condition.

The engine output control is initiated at a time $t_0$ when the slip ratio S exceeds a predetermined value $S_2$. Subsequently, as seen from the second throttle opening degree $TH_2$ curve, the second throttle valve 14 is closed, held, opened, and held cyclically. Owing to the cyclic operation of the second throttle valve 14, the driving wheel slip is prevented from increasing excessively as is readily seen from the driving wheel speed variation characteristic curve $V_R$.

In order to make clear the feature of the present invention, the shift control using the shift scheduling map 26 (see FIG. 2) alone is explained. In this case, as will be understood from the driving wheel speed characteristic curve $V_R$, the driving wheel speed $V_R$ varies with variation in engine output caused by the engine output control. Since the variation in the driving wheel speed exceeds the hysteresis amount $\Delta V_{23}$. Thus, an upshift from the second speed to the third speed is effected at a time $t_1$, a downshift from the third speed to the second speed is made at a time $t_2$ immediately after the time $t_1$, an upshift from the second speed to the third speed is made at a time $t_3$, and then a downshift from the third speed to the second speed is mode at a time $t_4$, as will be understood from the variation in the shift signal illustrated by the broken lines at the bottom of FIG. 6. This periodic shift in speed position is unnecessary and thus undesired.

This problem has been solved according to the preceding first embodiment, since the hysteresis amount is increased from $\Delta V_{23}$ to $\Delta V'_{23}$ so that the variation in the driving wheel speed $V_R$ will not exceed $\Delta V'_{23}$. As a result, as is seen by the shift signal variation characteristic illustrated by the broken lines at the bottom of FIG. 6, there occurs an upshift from the second speed to the third speed at the time $t_1$ only. Hence, the unnecessary periodic shift is avoided.

The undesired periodic shift is prevented in the same manner during the torque control to control driving wheel slip when the vehicle is rapidly accelerated or when the vehicle enters a terrain with a low friction coefficient (low $\mu$) from a terrain with a high friction coefficient (high $\mu$).

Figure 7:
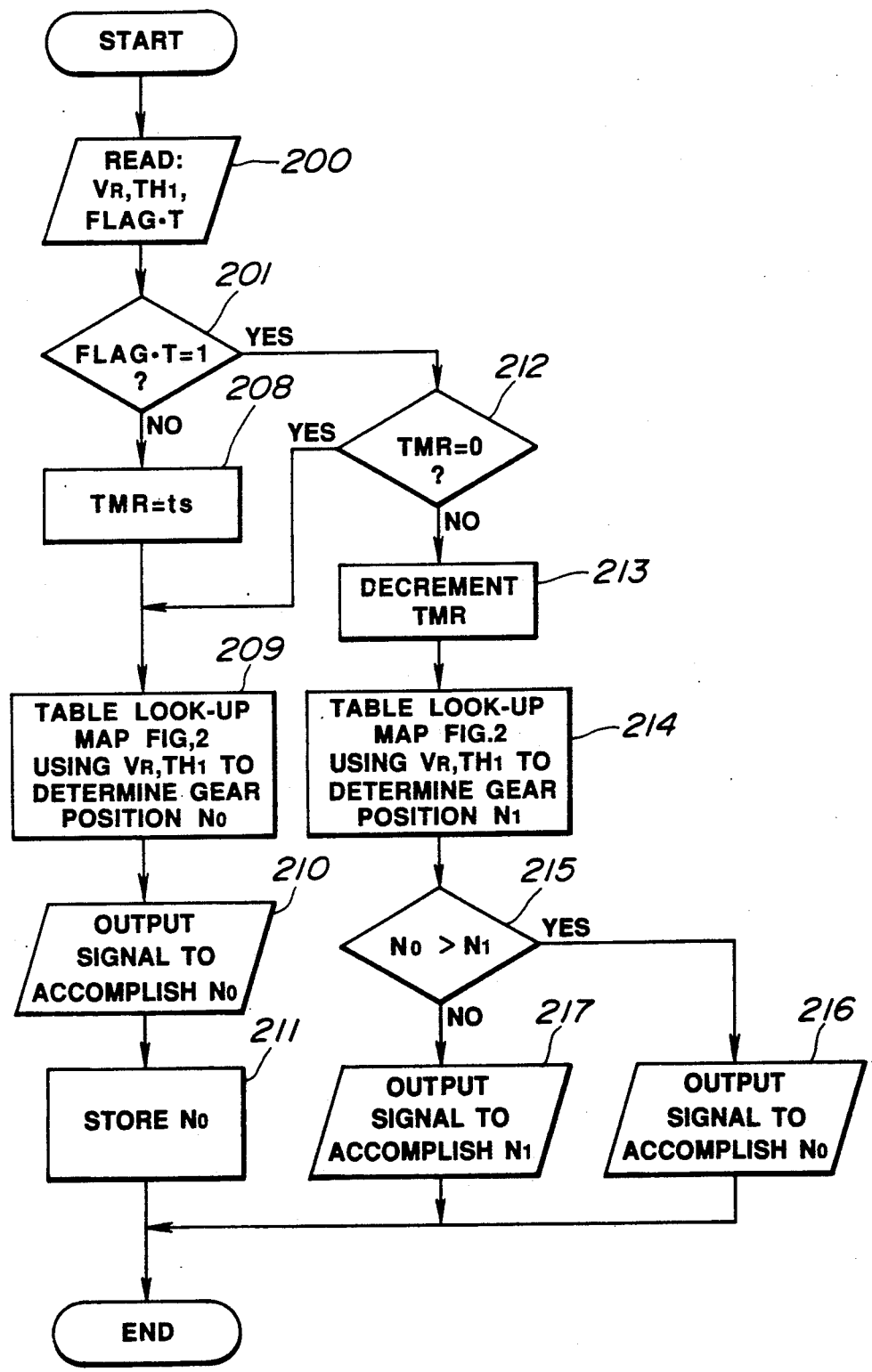
FIG. 7 is a flowchart used in the second embodiment according to the present invention.
Figure 8:
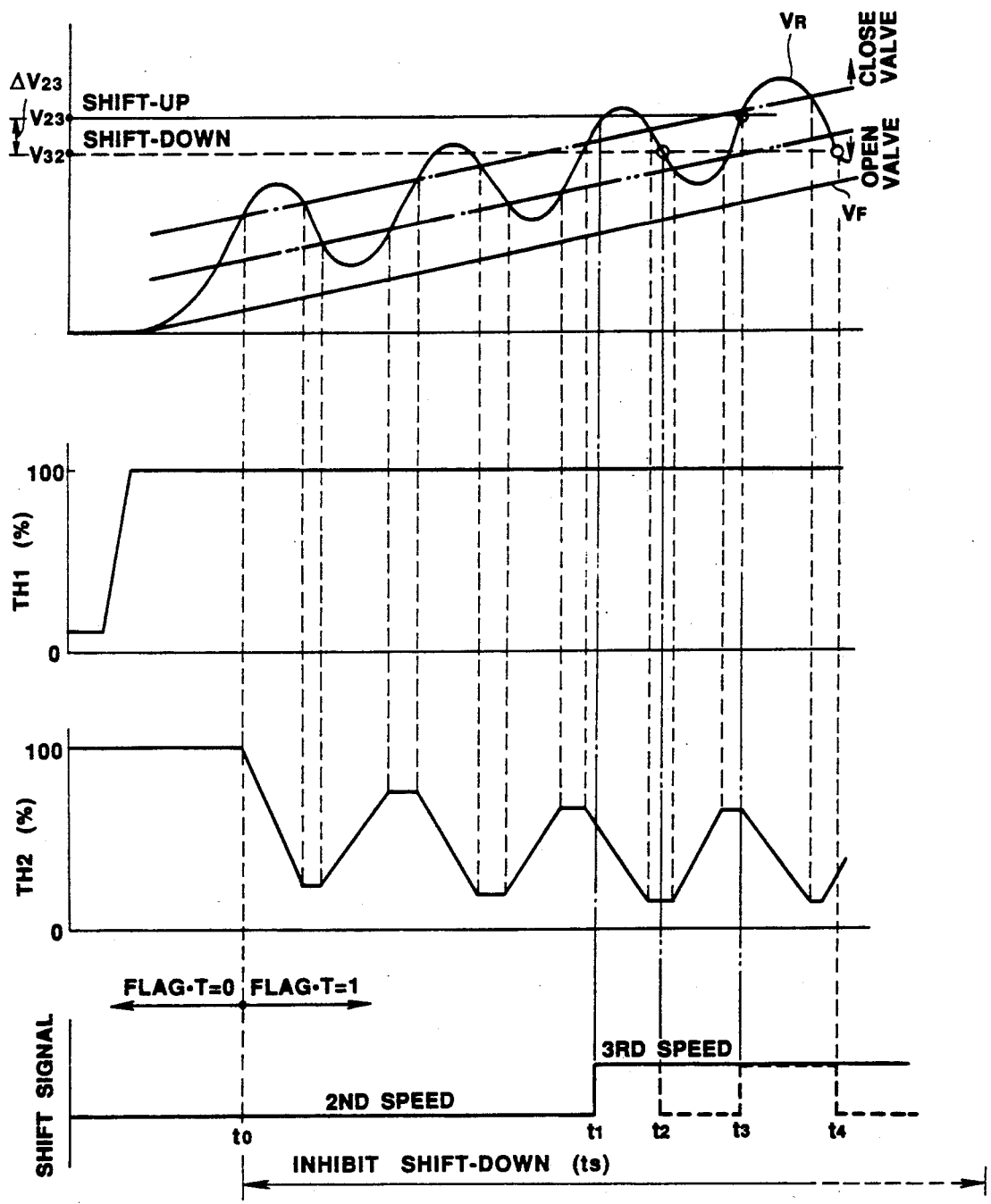
FIG. 8 is a similar time chart to FIG. 6 to illustrate the feature of the second embodiment.

Referring next to FIGS. 7 and 8, a second embodiment according to the present invention is described. This embodiment is substantially the same as the first embodiment except that instead of replacing the shift scheduling map 26 with a new one after initiation of the engine output control, a downshift is inhibited during a predetermined length of time $t_s$ after the initiation of the engine output control.

This feature of the second embodiment is explained along with the flowchart shown in FIG. 7.

In FIG. 7, at a step 200, a reading operation of $V_R$, $TH_1$, and FLAG.T is performed.

At a step 201, a determination is made whether the status that FLAG T=1 is established or not to check whether or not the engine output control has been initiated.

If, at the step 201, FLAG.T=0, the program proceeds to a step 208 where a timer TMR is reset to a predetermined value $t_s$ indicative of the predetermined length of time. Then, at a step 209, a table look-up operation of the shift scheduling map 26 is performed using $V_R$ and $TH_1$ to determine a gear position $N_0$. Then, the program proceeds to a step 210 where shift command signals are supplied to shift solenoids 23 and 24 to render them to accomplish the gear position $N_0$ determined. Thereafter, at a step 211, the gear position $N_0$ determined is stored in the RAM.

If, at the step 201, FLAG T=1, the program proceeds to a step 212 where a determination is made whether or not the content of the timer TMR is zero. When the TMR becomes 0, the program proceeds to the step 209 where the normal shift point control based on the shift scheduling map 26 is performed. When the content of the timer TMR has not reduced down to 0, the program proceeds to a step 213.

At the step 213, the content of the timer TMR is decremented. At the step 214, a table look-up operation of the shift scheduling map 26 is performed using $V_R$ and $TH_1$ in order to determine a gear position $N_1$. Then, the program proceeds to a step 215 where a comparison is made between $N_0$ and $N_1$. If, at the step 214 $N_0 > N_1$, indicating that a downshift to the gear position $N_1$ determined at the step 214 is demanded, the program proceeds to a step 216 where the downshift to the gear position $N_1$ is inhibited by rendering the shift solenoids 22 and 23 to maintain their statuses corresponding to the gear position $N_0$. If, at the step 215, $N_0 \leq N_1$, indicating that there is a demand to maintain the gear position or to make an upshift, the program proceeds to a step 217 where the shift command signals are generated which render the shift solenoids 23 and 24 to establish the gear position $N_1$ determined at the step 214.

FIG. 8 is a time chart showing in the fully drawn lines the fact that the downshift is inhibited during the predetermined length of time $t_s$ beginning with the initiation (time $t_0$ of the engine output control. As is seen from the time chart shown in FIG. 8, the periodic shift in speed position is prevented from taking place except an upshift taking place at the time $t_1$.

In the first embodiment, two shift scheduling maps 26 and 27 with the same upshift lines are used to suppress an undesired periodic shift in speed position when the engine output control is carried out. Alternatively, two shift scheduling maps with the same downshift lines may be used where the shift-up vehicle speeds of one map are deviated toward the high vehicle speed side than those of the other map so as to provide an increased hysteresis amount $\Delta V$. The use of these maps is suitable for the case where an upshift is restrained to suppress undesired periodic shift in speed position which otherwise would occur in the absence of the present invention. Alternatively, two shift scheduling maps may be used where the shift-up vehicle speeds of one map are deviated toward the higher vehicle speed side than those of the other map and the shift down vehicle speeds of the one map are deviated toward the lower vehicle speed side than those of the other map so as to provide an increased hysteresis amount $\Delta V$ between one upshift line with respect to the corresponding downshift line. The use of these maps is suitable to the case where both upshift and downshift are restrained to suppress undesired shift in speed position which otherwise would occur in the absence of the present invention.

In the first embodiment, the use of only two shift scheduling maps is proposed. However, if it is desired to determine a gear position in accordance with the characteristic of slip taking place during the engine output control, more than two shift scheduling maps may be used in accordance with the level of the driving wheel speed (or vehicle speed) $V_R$. Alternatively, each bit of data from the shift scheduling map 26 is expressed as a function of vehicle speed and a coefficient of the function is varied in accordance with the level of the driving wheel speed $V_R$ so as to vary the hysteresis amount $\Delta V$.

In the second embodiment, the downshift is inhibited during a predetermined length of time $t_s$ beginning with the time $t_0$ when the engine output control is initiated. Alternatively, the timing at which the predetermined length of time begins may be delayed to the subsequent time when the first upshift takes place after the engine output control has been initiated. Alternatively, the predetermined length of time may be variable beginning with the time when the engine output control is initiated to the time when it is terminated. Alternatively, the variable predetermined length of time may cover only that portion where the undesired periodic shift in speed position is expected to take place after the engine output control has been initiated. Whether the undesired periodic shift in speed position may occur or not can be detected by monitoring the frequency of slip and the manner how the frequency of slip converges.

What is claimed is:

1. A system for controlling a shift in speed position in an automatic transmission drivingly connected to an engine of an automotive vehicle with an accelerator pedal and driving wheels, the engine including a throttle valve which opens in degrees in response to the accelerator pedal, the automatic transmission including an output shaft drivingly connected to the driving wheels, the automotive vehicle including slip control means for controlling an engine output in order to suppress slip which the driving wheels undergo, throttle opening degree sensor means for measuring a throttle opening degree of the throttle valve and generating a throttle opening degree indicative signal, and vehicle speed sensor means for measuring a revolution speed of the transmission output shaft and generating a vehicle speed indicative signal indicative of the revolution speed of the transmission output shaft measured, the system comprising:

means responsive to the throttle opening degree indicative signal and the vehicle speed indicative signal for determining a speed position in accordance with a predetermined shift schedule;

said means responsive determining a new speed position, that has been changed by an up-shift from an old gear position when the vehicle speed indicative signal exceeds a predetermined shift-up vehicle speed with the throttle indicative signal being at a predetermined value, and fails to return to said old gear position until the vehicle speed indicative signal drops down to a predetermined shift-down vehicle speed with the throttle indicative signal being at said predetermined value, said predetermined shift-down vehicle speed being lower than said shift-up vehicle speed by a hysteresis amount; and means for modulating said means responsive to suppress the shift in speed position when the slip control means controls said engine output of the engine.

2. A system as claimed in claim 1, wherein said modulating means include means for increasing said hysteresis amount when the slip control means controls said engine output of the engine.

3. A system as claimed in claim 1, wherein said modulating means include means for containing a plurality of shift scheduling maps which are selectively used to provide said predetermined shift schedule.

4. A system as claimed in claim 1, wherein said modulating means include means for inhibiting a downshift in speed position for a predetermined length of time after the slip control means has begun controlling said engine output control of the engine.

5. A method of controlling a shift in speed position in an automatic transmission drivingly connected to an engine of an automotive vehicle with an accelerator pedal and driving wheels, the engine including a throttle valve which opens in degrees in response to the accelerator pedal, the automatic transmission including an output shaft drivingly connected to the driving wheels, the automotive vehicle including slip control means for controlling the engine output in order to suppress slip which the driving wheels undergo, throttle opening degree sensor means for measuring a throttle opening degree of the throttle valve and generating a throttle opening degree indicative signal, and vehicle speed sensor means for measuring a revolution speed of the transmission output shaft and generating a vehicle speed indicative signal indicative of the revolution speed of the transmission output shaft measured, the method comprising the steps of:

determining, responsive to the throttle opening degree indicative signal and the vehicle speed indicative signal, a speed position in accordance with a predetermined shift schedule, with which a new speed position, that has been changed by an upshift from an old gear position when the vehicle speed indicative signal exceeds a predetermined shift-up vehicle speed with the throttle indicative signal being at a predetermined value, fails to return to said old gear position until the vehicle speed indicative signal drops down to a predetermined shift-down vehicle speed with the throttle indicative signal being at said predetermined value, said predetermined shift-down vehicle speed being lower than said shift-up vehicle speed by a hysteresis amount; and modulating said speed position determining step such as to suppress the shift in speed position when the slip control means controls said engine output of the engine.

* * * * *